United States Patent
Thornton, II et al.

(10) Patent No.: US 11,501,258 B1
(45) Date of Patent: Nov. 15, 2022

(54) SYSTEMS AND METHODS FOR MEDIATING JOB APPLICATIONS BETWEEN USER DEVICES AND APPLICATION TRACKING SYSTEMS

(71) Applicant: INDEED, INC., Austin, TX (US)

(72) Inventors: Vance Tracy Thornton, II, Larkspur, CA (US); Gregory Klets, Palo Alto, CA (US); Ernest Mishkin, San Francisco, CA (US); Varun Kumar Sharma, San Francisco, CA (US); James Vincent Spinosa, San Francisco, CA (US)

(73) Assignee: INDEED, Inc., Austin, TX (US)

( * ) Notice: Subject to any disclaimer, the term of this patent is extended or adjusted under 35 U.S.C. 154(b) by 996 days.

(21) Appl. No.: 15/449,705

(22) Filed: Mar. 3, 2017

(51) Int. Cl.
*G06Q 10/10* (2012.01)
*H04L 67/02* (2022.01)
*H04L 67/564* (2022.01)

(52) U.S. Cl.
CPC ......... *G06Q 10/1053* (2013.01); *H04L 67/02* (2013.01); *H04L 67/564* (2022.05)

(58) Field of Classification Search
CPC ............. G06Q 10/105; G06Q 10/1053; G06Q 10/0631–06316; H04L 67/02; H04L 67/2819; H04L 67/28; H04L 67/289; H04L 67/2823; H04L 67/2828; H04L 63/0421; H04L 63/0281; H04L 61/307; H04L 67/56; H04L 67/565; H04L 67/5651; H04L 67/564; G06F 16/955; G06F 16/9566; G06F 16/9558; G06F 16/954; G06F 16/94; G06F 16/9577; G06F 40/134; G06F 40/174
See application file for complete search history.

(56) References Cited

U.S. PATENT DOCUMENTS

| | | | | |
|---|---|---|---|---|
| 5,961,593 A * | 10/1999 | Gabber | ............... | G01M 13/021 370/329 |
| 6,363,376 B1 * | 3/2002 | Wiens | ..................... | G06Q 10/10 |
| 6,643,687 B1 * | 11/2003 | Dickie | ................. | G06Q 10/107 709/206 |
| 8,682,806 B1 * | 3/2014 | Cate | ................... | G06Q 10/1053 705/321 |
| 8,799,515 B1 * | 8/2014 | Wu | ...................... | H04L 63/0272 709/246 |
| 9,313,170 B1 * | 4/2016 | Shoemaker | ....... | H04L 29/06653 |
| 2002/0099739 A1 * | 7/2002 | Fischer | ............... | G06F 16/9577 715/239 |
| 2003/0182171 A1 * | 9/2003 | Vianello | ............ | G06Q 30/0273 705/7.14 |

(Continued)

Primary Examiner — David S Posigian

(57) ABSTRACT

A method and apparatus for mediating job applications between user devices and application tracking systems is described. The method may include accessing a job application web page served from an application tracking system. The method may also include rewriting at least a portion of the job application web page and one or more links within the job application web page to at least resolve at the real time proxy system and not an original target location of the one or more links. The method may further include serving a rewritten version of the job application web page from the real time proxy system to the user system, converting a response received from the user system to the rewritten version of the job application web page, and submitting the converted response to the application tracking system.

29 Claims, 8 Drawing Sheets

(56) References Cited

U.S. PATENT DOCUMENTS

| | | | | |
|---|---|---|---|---|
| 2004/0095400 A1* | 5/2004 | Anderson | G06F 16/9577 | 715/864 |
| 2004/0103371 A1* | 5/2004 | Chen | G06F 16/9577 | 715/205 |
| 2004/0148571 A1* | 7/2004 | Lue | G06F 16/9577 | 715/239 |
| 2005/0204011 A1* | 9/2005 | Velayudham | H04L 61/303 | 709/206 |
| 2011/0060997 A1* | 3/2011 | Scoda | G06F 16/9577 | 715/738 |
| 2011/0196801 A1* | 8/2011 | Ellis | G06F 16/334 | 705/321 |
| 2013/0212467 A1* | 8/2013 | Ruan | G06F 16/248 | 715/234 |
| 2015/0213413 A1* | 7/2015 | Faron | G06Q 10/1053 | 705/321 |
| 2015/0286990 A1* | 10/2015 | Adair | G06Q 10/1053 | 705/319 |
| 2015/0378976 A1* | 12/2015 | Lockhart | G06F 3/0481 | 715/221 |

* cited by examiner

SYSTEMS AND METHODS FOR MEDIATING JOB APPLICATIONS BETWEEN USER DEVICES AND APPLICATION TRACKING SYSTEMS

TECHNICAL FIELD

Embodiments of the invention relate to the field of data management, and more particularly, to dynamically providing web page based job applications to user systems.

BACKGROUND

The internet provides a convenient way to disseminate information to a large amount of people. One popular usage of disseminating information via the internet is through listings of employment opportunities provided on job listing web pages. For example, companies will frequently have one or more listings of job descriptions on their websites that elaborate on qualifications for specific positions, job and skills descriptions, salary, location, etc. Furthermore, the listings of job descriptions typically include a mechanism for users to apply for the listed jobs, such as providing a series of web pages in which the user can enter information relevant to their background and skills.

Once the job application process is initiated, a user is walked through one or more of the job application web pages that display various input forms. However, the web pages are typically not well suited to mobile devices, such as mobile telephones, because mobile devices have limited display capabilities. Furthermore, users typically do not have access to their resumes on their mobile device, for example, due to lack of support for a file system. Yet another complication arises when a user is pursuing multiple jobs at different employers. In this scenario it may become tedious to remember different login credentials for accessing each application system, tracking communication from the different application systems, advancing in different application processes that require different user information, etc.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
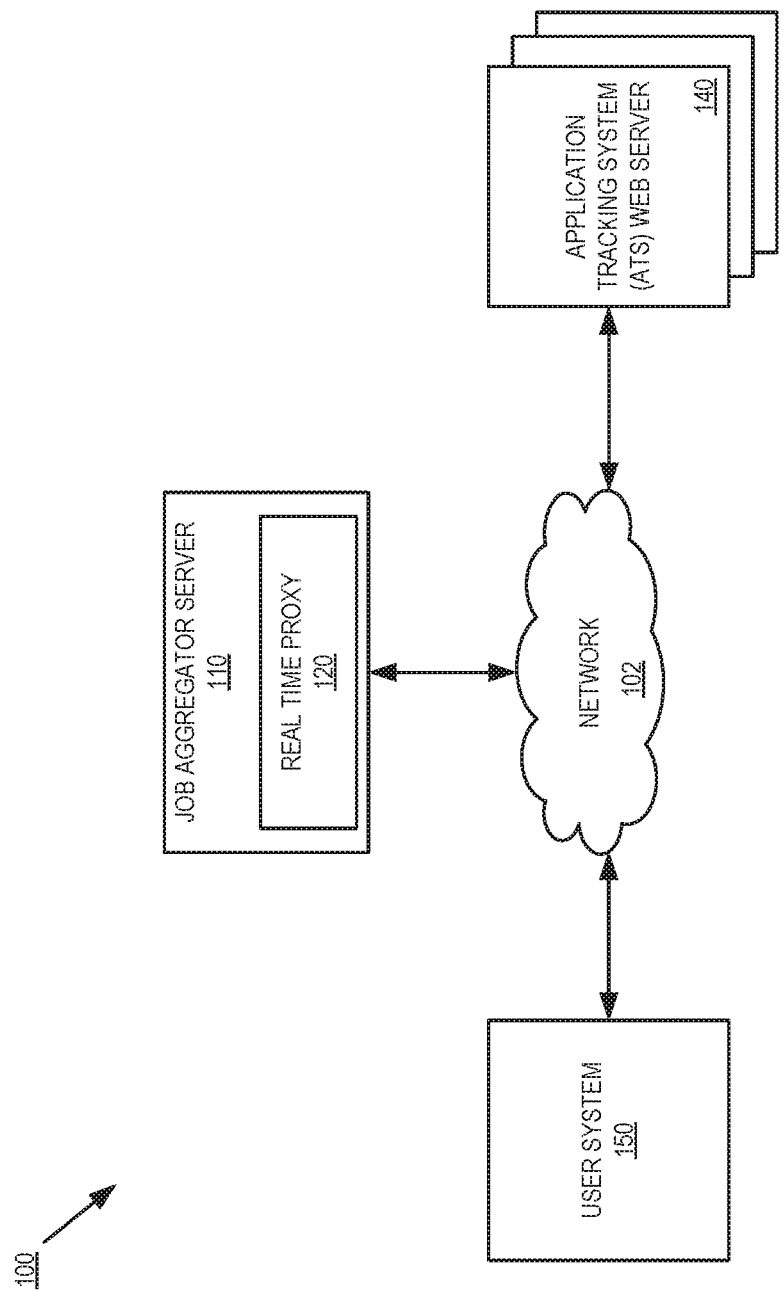
FIG. 1 is a block diagram of an exemplary system architecture for providing a real time proxy to act as an intermediary between a user system and a plurality of application tracking system web servers.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Embodiments of methods and systems for providing a real time proxy (RTP) system to act as an intermediary between a plurality of different application tracking systems (e.g., employer job web servers) and a user system are described. Web page based job applications are served by application tracking system (ATS) web servers and may consist of a series of web pages that request user inputted data relevant to a job application, such as bibliographic information (e.g., first name, last name, birthdate, etc.), work experience information (e.g., current employer, length of employment, former employer, etc.), educational information (e.g., college, degree, advanced education, etc.), relevant skills (e.g., related work experience, certifications, project descriptions, etc.), as well as requests for other data such as requests to attach resumes, reference lists, etc. Such a series of web pages is a job application flow of the ATS.

In embodiments, discussed in greater detail below, the RTP system is a dynamic system that interacts with a plurality of ATSs on behalf of a user system. That is, the RTP system interacts with a particular ATS on the fly as the user is participating in an application process with that ATS. Instead of a user system interacting directly with the ATS to participate in a job application process (e.g., traversal of a series of web pages in a job application flow), in embodiments, the user system interacts directly with the RTP system, which in turn interacts with the ATS. Furthermore, as discussed in greater detail below, the RTP system may determine when to interact directly with the user system as an intermediary (e.g. to serve job application web pages in job application process), as well as when direct communication between the user system and the ATS is appropriate (e.g., providing certain images, detecting certain domains third party domains, detecting certain third party websites, etc.) based on one or more criteria for determining between direct and mediated communication.

In one embodiment, the RTP requests web pages from an ATS in the job application flow and rewrites the web pages, for example, to be mobile friendly, to provide a similar interface between different ATSs, to provide a similar flow between different ATSs, etc. These rewritten web pages are provided to the user system, which can respond to the RTP system, such as by providing data, selecting graphical user interface elements, uploading files, etc. The RTP system then translates and/or converts the user system responses to a form suitable for submission to the ATS. For example, the RTP system may utilize JavaScript to submit user supplied data to the ATS. Because the RTP system provides a dynamic interaction between the ATS and the user system, the RTP system is able to provide validation for user entered data, validation for progress within an application process, and validation for successful submission of a job application.

Furthermore, because the RTP system provides dynamic interaction with a plurality of different ATS systems, the RTP system may securely maintain certain user data and automatically supply such user data, when appropriate, in subsequent job application processes. For example, a user system will supply certain information to the RTP system at the initiation of a job application process. In one embodiment, this information can include an email address for a user of the user system and a resume of the user (e.g., an image of the user's resume, a link to a resume file, access to a third party system that stores the resume, etc.). Then, during an application process, the RTP system can automatically submit the user's resume, parse the resume for bibliographic information, use the email address to generate login credentials at the ATS, etc. These operations can be performed by the RTP system automatically, and without user intervention or even user notification, to simplify and expedite the application process with various ATSs.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "generating", "converting", "executing", "storing", "receiving", "obtaining", "constructing", "accessing", "capturing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of an exemplary system architecture 100 for providing a real time proxy to act as an intermediary between a user system and a plurality of application tracking system web servers. In one embodiment, the system 100 includes a job aggregation server 110 having a real time proxy (RTP) 120, a plurality of application tracking system (ATS) web servers 140, and a user system 150. In one embodiment, job aggregation server 110 and ATS web servers 140 are executed on computing devices, such as one or more server computers, desktop computers, etc. Furthermore, each of the plurality of ATS web servers 140 may be served by one or more different server computer systems (not shown). In one embodiment, user system 150 is also a computing device, such as a mobile telephone, tablet computer, smart watch, or other mobile device with limited display capabilities. However, user system 150 may also be a computing device, such as a desktop computer, laptop computer, etc.

The job aggregation server 110, ATS web servers 140, and user system 150 may be coupled to a network 102 and communicate with one another using any of the standard protocols for the exchange of information. In one embodiment, one or more of the job aggregation server 110, ATS web servers 140, and user system 150 are communicatively coupled via one Local Area Network (LAN) and may be incorporated into the same physical or logical system, or different physical or logical systems. Alternatively, the job aggregation server 110, ATS web servers 140, and user system 150 may be communicatively coupled via different LANs, wide area networks, cellular telephone networks, etc. that may be coupled together via the Internet but separated by firewalls, routers, and/or other network devices. It should be noted that various other network configurations can be used including, for example, hosted configurations, distributed configurations, centralized configurations, etc.

In one embodiment, each of the ATS web servers 140 serves a set of web pages that provide listings of job descriptions for various jobs of different entities. Furthermore, the job descriptions are linked to corresponding job application processes served by the ATS web servers 140. In embodiments, a job application process or flow is a series of sequential web pages that request certain user information (e.g., bibliographic information, work experience, references, resume, writing samples, etc.) typically collected for a job application. Each ATS web server 140 may be associated with a different employer, and thus the formatting, flow, data requested, length, user credentials (e.g., login and password), etc. will be different. Thus, it becomes extremely challenging for a user to manage different applications at different ATS web servers 140 (e.g., remembering different passwords, progress levels, whether applications were completed, etc.). Furthermore, when user system 150 is a mobile device, it may be difficult or impossible to complete a job application due to the limited capabilities of the mobile device (e.g., an inability to display certain elements, inability to render certain script, etc.) and the formatting the application flows by the different ATSs 140.

In one embodiment, RTP 120 of job aggregation server 110 provides a real time and dynamic system that enables user system 150 to interact in real time with any ATS web server 140 for completing a job application process. Job aggregation server maintains a collection of available jobs provided by each of the ATS web servers 140. For example, job aggregation server 110 may crawl ATS web servers 140, may receive postings from ATS web servers 140, etc. This collection of available jobs may then be provided to user system 150 by job aggregator server 110, for example, in a web page listing of jobs to which a user of user system 150 can apply.

In one embodiment, in response to receiving a request from user system 150 to apply for a job listed on job aggregation server 110, RTP 120 requests a user email address and obtains a resume of the user. The user email address, in embodiments, serves as an identifier of the user and enables electronic communication between RTP 120 and user system 150. In embodiments, the user's resume is obtained by RTP 120 by one or more of user upload directly to the RTP 120, by receiving an image of the user's resume captured by user system 150, by receiving a file containing the resume from a third party system (not shown), etc.

Once RTP 120 obtains this preliminary information, RTP 120 translates the user system 150 request to apply for the job to a form understandable by the ATS web server 140. For example, an HTML button selection, JavaScript request, etc. is provided from the RTP 120 to the ATS web server 140. In embodiments, the ATS web server 140 will then respond, such as by returning a web page in a job application flow. However, the interaction is between the RTP 120 and the ATS web server 140, and may not be in a form suitable for presentation on user system 150 (e.g., when user system 150 is a mobile device). Thus, the RTP 120 performs one or more rewriting operations on the ATS web server 140 job application web page. In one embodiment, the rewriting operations can include reformatting one or more elements in the ATS web server 140 job application web page, such as making them mobile friendly, conforming user interface elements to a common appearance, removing copyrighted material, intercepting calls to create pop-ups that may bypass the RTP 120 and inserting a mobile friendly user interface element, such as an iframe HTML element, having the popup's content and flowing through the RTP 120, merging, deleting, or replacing one or more iframe HTML elements from an original web page into a mobile friendly form, etc. In one embodiment, the rewriting operations further include rewriting links in the ATS web server 140 job application web page to point to the RTP 120 instead of the ATS web server 140. That is, when ultimately served to the user system 150 from RTP 120, the rewritten links in the job application web page will ensure that when the user system 150 interacts with any link, picture, field, etc., the user's interaction with the element will resolve at the RTP 120 and will not bypass the RTP 120. In embodiments, the rewriting can also include rewriting and/or handling JavaScript in a job application web page that will run in a web browser at user system 150, rewriting and/or handling AJAX request(s) within the ATS web server 140 job application web page, rewriting or resolving dynamic HTML or other web page elements, as well as rewriting or handling any other element that would bypass the RTP 120 if selected by user system 150. RTP 120 then provides the rewritten version of the ATS web server 140 job application web page to the user system 150. In embodiments, additional tangential web pages provided by the ATS web server 140 may also be intercepted, rewritten, and managed according to the discussion herein. The tangential web pages can include job application feedback forms, satisfaction surveys, or other web page flows that are related to a job application, but not part of a job application.

When the user system 150 interacts with the rewritten version of the ATS web server 140 job application web page, such as by selecting a link, entering data, submitting forms, etc., the interactions are received by RTP 120 because any link, form, field, etc. resolves at the RTP 120 instead of the target ATS web server 140. As discussed above, RTP 120 translates and/or converts these received interactions to a form suitable for submission to ATS web server 140, such as preparing a form submission, requesting a selected link, JavaScript execution, etc. ATS 140 will again return an ATS web server 140 job application web page within the job application flow. This process continues until a user of user system 150 completes a job application with ATS web server 140.

In embodiments, RTP 120 stands in between user system 150 and ATS web server 140 and acts as a dynamic intermediary between the systems. Rather than pre-crawling and converting a job application from an ATS web server, which is served in a static manner to user system 150, the dynamic approach discussed herein enables RTP 120 to perform validation throughout the job application process with ATS web server 140. For example, if a user entered email address is not formatted properly, a date exceeds a range, a job prerequisite is not satisfied, etc., and ATS web server 140 generates an error, RTP 120 provides this error for resolution to the user system 150 and directs the user system to the RTP 120. Similarly, when there is a successful action, the user is also directed through the RTP 120. As a result, any errors and/or successes in a job application process can be handled as they arise through the RTP 120.

Furthermore, in embodiments, additional tangential web pages provided by the ATS web server 140 may also be intercepted, rewritten, and managed according to the discussion herein. The tangential web pages can include job application feedback forms, satisfaction surveys, disclosure acknowledgements, or other web page flows provided to a user during a job application process. These tangential web pages are related to a job application, and may even be generated by the ATS web server 140 during a job application process, but they do not for part of the job application.

Figure 2:
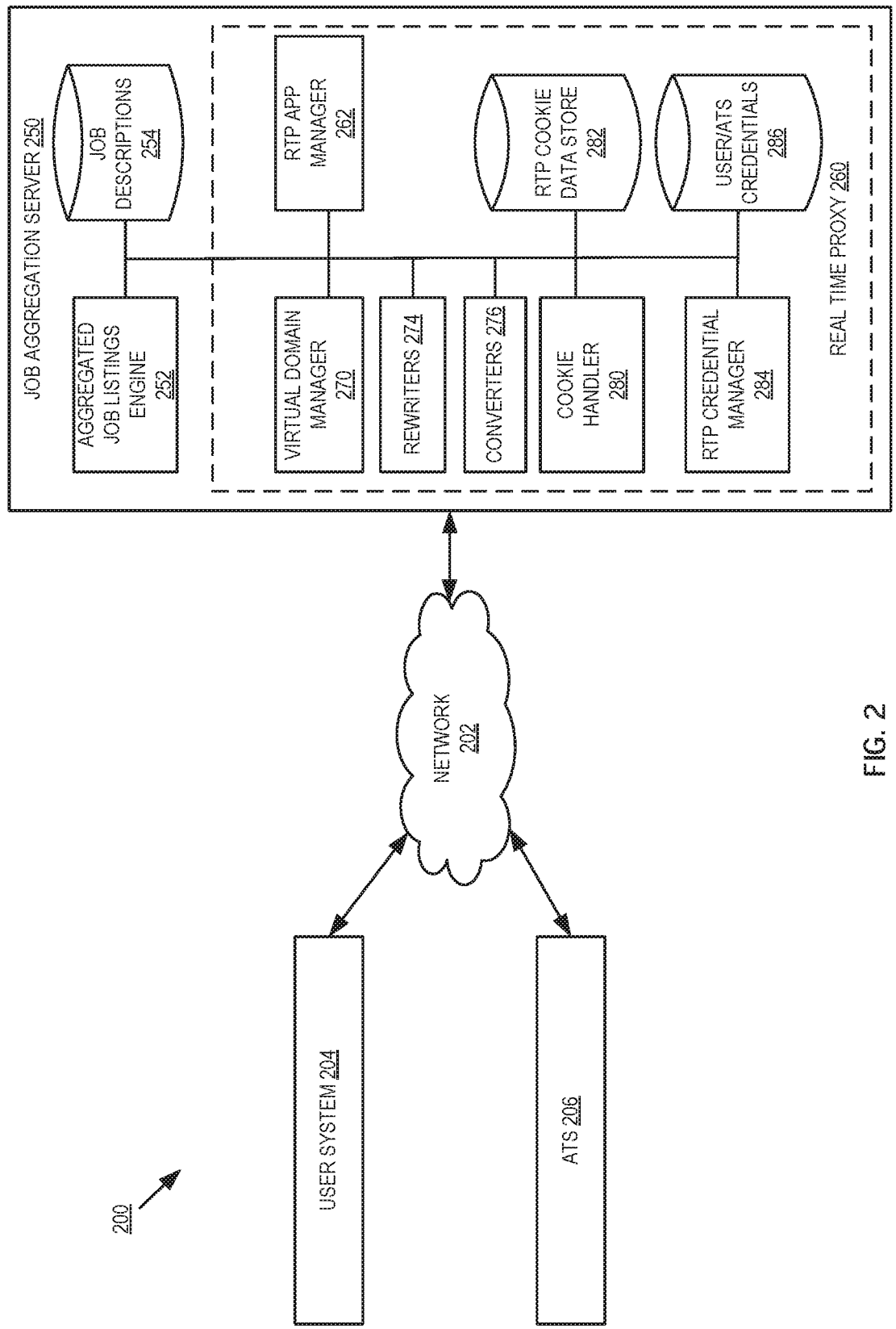
FIG. 2 is a block diagram of one embodiment of a job aggregation server providing a real time proxy for providing web page based job applications from an application tracking system to a user system.

FIG. 2 is a block diagram of one embodiment 200 of a job aggregation server 250 with a real time proxy (RTP) 260. Job aggregation server 250 and RTP 260 provide additional details for the job aggregation server and real time proxy discussed above in FIG. 1. In embodiments, RTP 260 may reside on job aggregation server 250. However, in other embodiments, RTP 260 may reside on a different server computer system communicably coupled with job aggregation server 250.

In one embodiment, job aggregation server 250 includes an aggregated job listings engine 252 coupled with a job descriptions database 254. The aggregated job listings engine 252 accesses job descriptions database 254 to provide a web page based listing of job descriptions collected from one or more job websites (e.g., ATS web servers 140) to user system 150. In one embodiment, a job description for a job is collected from ATS 206 prior to a request to view the listing by user system 204, such as by aggregated job listings engine 252 crawling a job description web page associated with ATS 206. In one embodiment, aggregated job listings engine 252 provides the resulting collection of job listings to user system 204 to enable a user to apply for any of the listed jobs using RTP 260 as an intermediary between user system 204 and ATS 206.

RTP 260 includes RTP app manager 262, virtual domain manager 270, rewriters 274, converters 276, cookie handler 280 coupled with RTP cookie data store 282, and RTP credential manager 284 coupled with user/ATS credentials store 286. In one embodiment, RTP app manager 262 receives a request from user system 204 to apply for a job listed in the aggregated listing provided by aggregated job listings engine 252. For example, RTP app manager 262 may intercept a request from user system 204 to apply for a job when user system selects an "apply" button within a web page. RTP app manager 262 then queries user system 204, for a new user, to supply RTP 260 with an email address and a resume associated with the user of the user device 204. In embodiments, however, RTP 260 may receive login credentials (e.g., a user email address and/or password) for an existing user of the job aggregation server 250. In such a case, the user's resume submitted at a prior time may be accessed by RTP app manager 262 from a user data store (not shown).

In one embodiment, RTP app manager 262 generates a unique RTP email address based on the supplied user information (e.g., user's email address, resume information, etc.) and associates the generated email address with the user supplied email address. The RTP app manager 262 utilizes the generated RTP email address when initiating the application with ATS 206 on behalf of user system 204, such as using the generated email address as a log-in with the ATS 206. Similarly, RTP credential manager 284 generates a unique password for the user system and the ATS. For example, a subset of user information supplied by user system 204 can be used to generate a unique password. The generated email address and password form a unique set of credentials that enable RTP 260 to access ATS 206 on behalf of user system 204 for completing the selected job application. RTP credential manager 284 stores the generated email address, password, and association with the user/job in user/ATS credentials store 286. In one embodiment, due to the potential sensitive nature of the information in an job application, the email address and password generated by RTP app manager 262 and RTP credential manager 284 are maintained in data store 286 in an encrypted form, and accessible only to an original user to minimize risk to the sensitive information in the event of a security breach. In embodiments, access to a key for decrypting the RTP email address and/or password may be predicated on authentication of a user supplied password and by providing encryption/decryption of the RTP email address and password. Additionally, a unique user password may be generated using an encryption key seed, the seed and/or encryption key may be split between two or more computer systems, decryption of an encrypted user password can be provided using the encryption key, or a combination measures. Furthermore, retention of information by RTP 260 and/or job aggregation server 250 may be predicated on first obtaining user permission to retain the information After login credentials are generated by RTP 260, RTP 260 initiates the job application process with ATS 206. In one embodiment, this can include generating a user account at ATS 206 by supplying the generated email address and password. ATS 206, within the application process, will respond with an ATS web page, which is received by RTP app manager 262 of RTP 260.

The received ATS web page is provided to rewriters 274. In one embodiment, rewriters 274 may include one or more rewriters that are responsible for parsing the web page and rewriting static and dynamic links within the ATS web page so that the links resolve at RTP 260 and not at ATS 206. As will be discussed in greater detail below, in order to track the appropriate application at the appropriate ATS, virtual domain manager 270 rewrites links by encoding all ATS domains into RTP subdomains (e.g., the links resolve at RTP 260, but the encoded subdomain information enables an ATS domain to be extracted). Because some links may be dynamically generated, rewriters 274 may run dynamic content (e.g., run script). Rewriters 274 also perform one or more formatting rewriting operations, such as removing copyrighted material, altering content to be mobile device friendly, fixing invalid HMTL/JavaScript, controlling user flow, detecting success or failure scenarios, showing transition elements between web pages in a job application flow, etc.

Cookie handler 280 also intercepts any cookie requests in the ATS web page. For example, the ATS web page, and the series of web pages in a job application, may create, set, edit, grow one or more ATS web page cookies for tracking user application progress, user information, etc. Furthermore, these ATS cookies are cookies in the ATS domain that may become unwieldy for web browsing session by user system 204. In one embodiment, cookie handler 280 stores generated ATS cookies for a job application session in RTP cookie data store 282, accesses stored ATS cookies for a job application session in order to set, edit, grow, etc. an existing ATS cookie, etc. Cookie handler 280 then substitutes, in the ATS web page, one or more simple RTP proxy 260 cookies for the ATS cookies being maintained by cookie handler 280 in RTP cookie data store 282. By substituting the relatively simple RTP cookie(s) for the ATS cookies, the cookie handler 280 may maintain the more complicated ATS cookies for each ATS job application session of user system 204. Additionally, when an ATS job application attempts to go get or set a cookie on the client side, cookie handler 280 intercepts such requests and handles them on with RTP 260 utilizing cookie data store 282.

After content has been rewritten, cookies have been managed, and virtual domains have been encoded, the rewritten ATS web page for a job application is provided to user system 204. This job application web page may request the user to enter additional information, select links, have links to additional ATS information (e.g., company policies, job descriptions, job requirements, etc.), as well as provide other content related to a job application flow. Each of these links, actions, etc. resolve at RTP 260 due to the rewriting and virtual domain encoding.

RTP app manager 262 receives the response from user system 204 (e.g., link selection, data entry into form fields, etc.). Virtual domain manager 270 extracts the target domain of any user response from the subdomain of the user response. Furthermore, any changes to the RTP cookie, which should be reflected in an ATS cookie, are set, edited, updated, by cookie handler 260 in RTP cookie data store 282. Converters 276 then translate the response into a form expected by the ATS 206. For example, formatting a user response into the proper format, executing JavaScript, etc. The translated response is then provided to ATS 206 for processing within the job application flow.

In embodiments, RTP 260 continues to act as an intermediary between user system 204 and ATS 206 during the job application process, such as by receiving additional web pages from ATS 206, rewriting elements and domains in those web pages, and providing the rewritten web pages to user system 204. Similarly, responses from the user system 204 are converted, selected virtual domains analyzed to extract actual target domains, ATS cookies updated as needed, etc., and then the responses provided to ATS 206. As discussed herein, RTP 260 performs these actions in real time as web pages are received from ATS 206, and as responses are generated by user system 204. The process continues to the completion of a job application, for which RTP 260 can provide validation to user system 204. However, a job application may be saved and later completed by a user of user system 204, such as by RTP 260 using the generated ATS credentials to access a partially completed job application, using the one or more ATS cookies to resume an application, etc.

In one embodiment, during the intermediary actions performed by RTP 260 discussed herein, not everything a user would normally do when interacting directly with ATS 206 is provided to user system 204 by RTP 260. In one embodiment, certain elements of the ATS application flow are hidden by RTP 260 when RTP has data needed to complete an application flow step. For example, during an application data flow, a resume ATS web page may request that a resume be uploaded to the ATS 206. Since RTP 260 acquires this information before the application process begins, the resume ATS web page is not displayed and/or provided to user system 204. Instead, RTP 260 automatically handles the action, and instead proceeds to the next application web page. In other embodiments, data already available to RTP 260 (e.g., user data, user email addresses, etc.) may be automatically entered into a form and/or submitted by RTP 260 rather than having user system 204 complete the action. This may result in entire ATS web pages to be automatically handled by RTP 260. However, where only portions can be automatically handled, those portions may be omitted from a rewritten web page served to user system 204 by RTP 260.

Therefore, RTP 260 greatly simplifies the application process by automatically performing several actions within an application flow with an ATS. Furthermore, when a user is simultaneously completing job applications with more than one ATS, RTP 260 may track and coordinate these different applications to simplify the process for the user. Additionally, because RTP 260 is performing these actions in real time, RTP 260 can perform real time validation and error handling for each job application.

Figure 3:
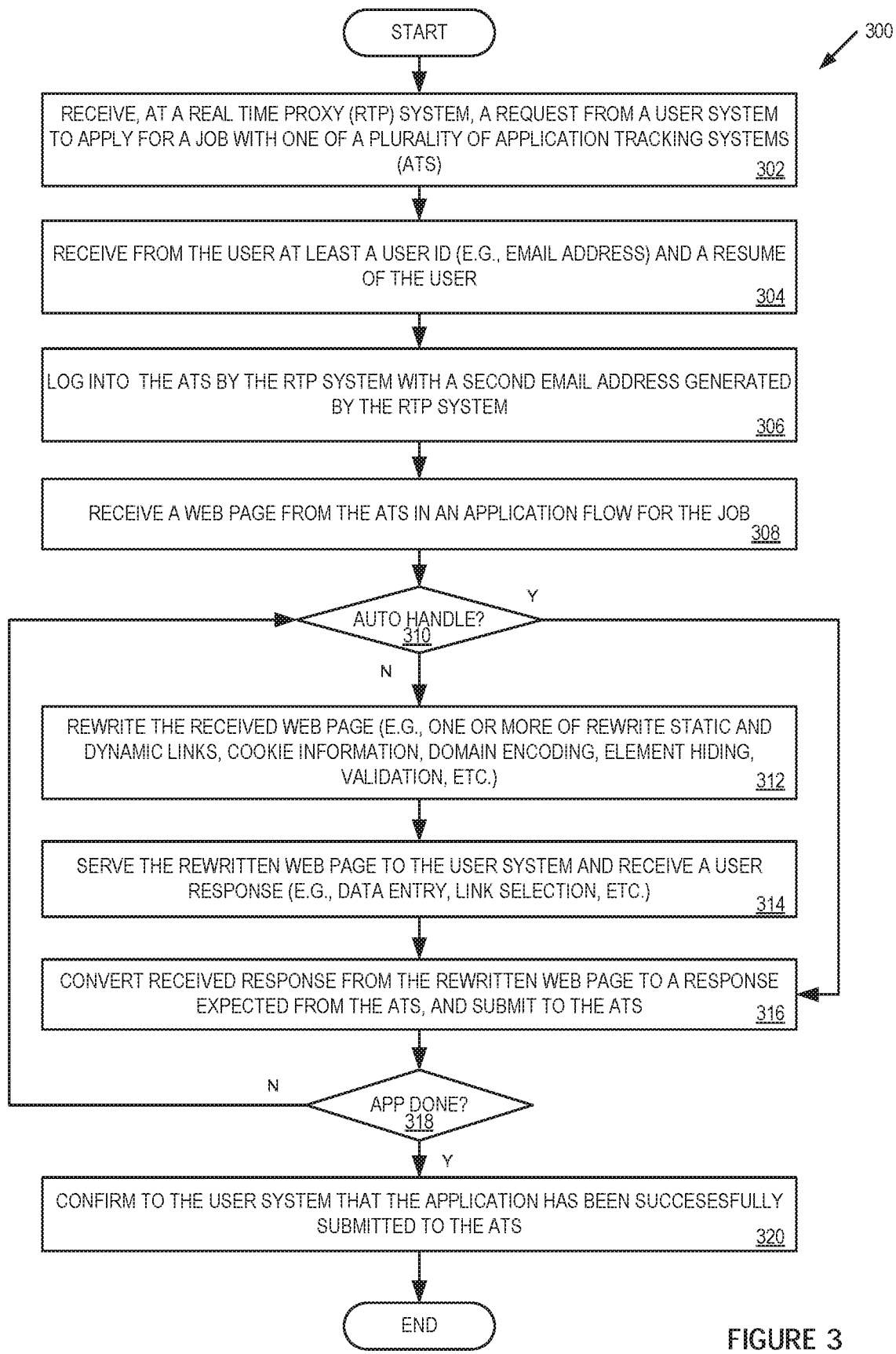
FIG. 3 is a flow diagram of one embodiment of a method for providing a web page based job application from an application tracking system to a user system by a real time proxy system.

FIG. 3 is a flow diagram of one embodiment of a method 300 for providing a web page based job application from an application tracking system to a user system by a real time proxy system. The method 300 is performed by processing logic that may comprise hardware (circuitry, dedicated logic, etc.), software (such as is run on a general purpose computer system or a dedicated machine), firmware, or a combination. In one embodiment, the method 300 is performed by RTP 120 or 260.

Referring to FIG. 3, processing logic begins by receiving, at an RTP, a request from a user system to apply for a job with one of a plurality of ATSs (processing block 302). In one embodiment, the request is received by the RTP in response to the user system selecting an "apply" link in a collected listing of jobs displayed in a web page. The link is associated with a particular job and ATS that originally posted the job. Processing logic then receives from the user at least a user identifier, such as an email address, and a user resume (processing block 304).

Processing logic then logs into the ATS by the RTP system with a second email address generated by the RTP system (processing block 306). As discussed herein, the RTP generates a second email address so that messages addressed to the second email address will be received by the RTP and the target (e.g., user system) of the message can be determined. In embodiments, a subset of user information, ATS information, job, etc. is used to generate the second email address for the RTP that uniquely identifies a user, ATS, and job.

Processing logic receives a web page from the ATS in an application for the job (processing block 308). In one embodiment, in response to a request to apply for a job, the ATS will provide a first in a series of web pages in a job application flow to the RTP (e.g., the device that requested the web page). For example, different web pages in the series of web pages may include web pages that request user information, contact information, work history, contacts, references, experience, etc.

Processing logic determines whether one or more elements of the received web page can be automatically handled by the RTP (processing block 310). When information is available to the RTP and may be used to automatically fill forms, supply requested information, upload files, etc., processing logic proceeds to processing block 316 to generate a response to the ATS, discussed below. However, when all or part of an ATS web page requires interaction with a user, the process proceeds to processing block 312. There, processing logic rewrites the received ATS web page (processing block 312). As discussed herein, the rewriting can include one or more of rewriting links so that an original target domain of the link is encoded into a virtual domain that resolves at the RTP, rewriting JavaScript or any other means by which a browser may initiate a request that bypass the RTP to restrict and modify such actions to flow through the RTP system, altering a format of the ATS web page to a mobile friendly format (when appropriate), handling ATS cookies and substituting RTP cookies, validating data entry, and hiding portions of the ATS web page which can be automatically handled.

The rewritten web page is then served to the user system by the RTP and a user response is received (processing block 314). The user response can include user data entered into fields, selected links, etc. The user response is received by the RTP, since all links in the web page resolve at the RTP, converted to a form expected by the ATS, and submitted to the ATS (processing block 316). As discussed in greater detail below, the conversion can include decoding received link selections to extract a target domain from a virtual domain, changing a form for submission to an ATS, updating cookie information, etc.

However, when the application is not completed (processing block 318), such as when a subsequent ATS web page in an application flow is received by processing logic of the RTP, the process returns to processing block 310 to again determine if any elements of the subsequent ATS web page can be automatically handled, page rewritten, served, etc. However, when the application is completed (processing block 318), the processing logic of the RTP can confirm to the user system successful submission of the application to the ATS (processing block 320).

As discussed herein, the RTP serves as an intermediary between a user system that is completing a job application for a user, and an ATS that is providing ATS job application web pages in an online job application process/flow. However, a domain of the RTP (e.g., "apply.RTP.com") is not the same as the domain of the ATS (e.g., "jobs.ATS.com"). Thus, any cookies used by the ATS for tracking an application and/or user system will not match or function properly since the RTP and ATS interact in a domain different from that of the RTP and the user system. Therefore, in one embodiment, the RTP utilizes a cookie handler per user session with the RTP.

Figure 4:
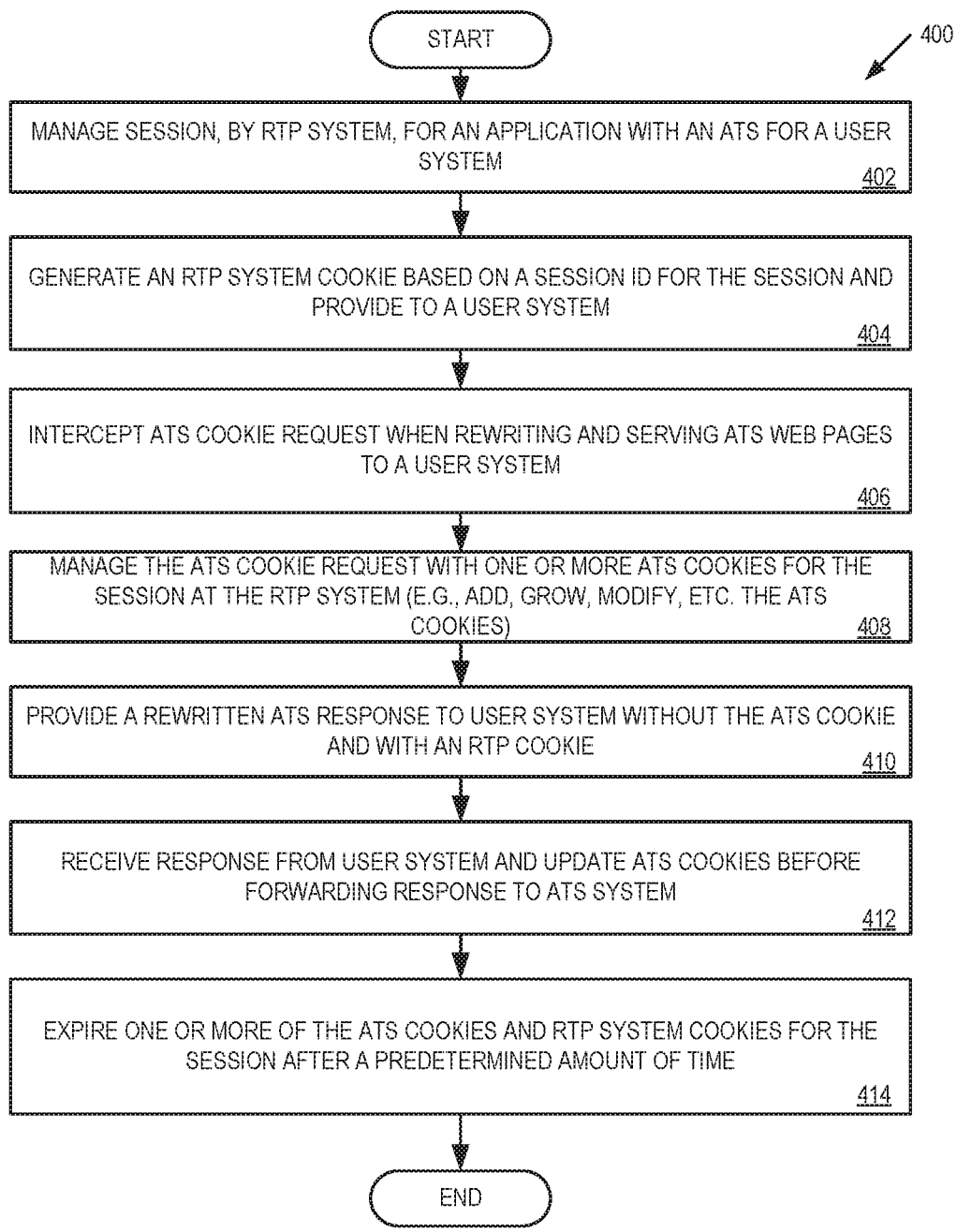
FIG. 4 is a flow diagram of one embodiment of a method for a real time proxy system to manage cookies during a job application process between a user system and an ATS.

FIG. 4 is a flow diagram of one embodiment of a method 400 for a real time proxy system to manage cookies during a job application process between a user system and an ATS. The method 400 is performed by processing logic that may comprise hardware (circuitry, dedicated logic, etc.), software (such as is run on a general purpose computer system or a dedicated machine), firmware, or a combination. In one embodiment, the method 400 is performed by RTP 120 or 260.

Referring to FIG. 4, processing logic begins by an RTP system managing a session for an application with an ATS on behalf of a user system (processing block 402). Processing logic of the RTP system generates an RTP system cookie based on a session identifier for the session, and provides the RTP system cookie to the user system (processing block 404).

During the application flow in which the RTP system acts as an intermediary between an ATS and a user system, processing logic intercepts an ATS cookie request when rewriting and serving ATS web pages to a user system (processing block 406). For example, a cookie handler 308 can intercept cookie requests during rewriting operations performed by an RTP. Similarly, cookie requests made by rewritten client side browser executable code may also be intercepted. Processing logic manages the ATS cookie request with one or more ATS cookies for the session at the RTP system (processing block 408). This management can include one or more of adding a new ATS cookie associated with the session, growing an existing cookie associated with the session, modifying an existing cookie, etc.

Processing logic then provides a rewritten ATS response to the user system without the ATS cookie and with an RTP cookie (processing block 410). That is, any reference to creating, accessing, modifying, etc. ATS cookies are removed from the rewritten web page served to the user system. Instead, a relatively simple session specific RTP cookie can be used during communication between the user system and the RTP. Processing logic receives a response from the user system and updates ATS cookie(s) as maintained at the RTP before forwarding the response to the ATS (processing block 412).

Processing logic then expires one or more of the ATS and RTP cookies for the session after a predetermined amount of time (processing block 414). For example, after inactivity of a cookie for a session for 24 hours, 7 days, one month, etc., processing logic can remove the cookie from a cookie data store maintained by the RTP.

In addition to managing cookies, the RTP utilizes virtual domains to ensure that rewritten web pages resolve at the RTP while the original target domain can still be determined. For example, an original target domain in an ATS web page could be "job.ATS.com". If this were supplied to a user system, and selected by a user, the RTP would cease to be an intermediary as the user's browser would be redirected to the ATS. Thus, in one embodiment, the original target domain is encoded into a subdomain of the RTP to obtain an encoded, virtual domain. Continuing the example above, "job.ATS.com" could be encoded to virtual domain "job_ATS_com.app.RTP.com" so that "job_ATS_com" would be extractable from the virtual domain when received from a user system. Once extracted, the original target domain can be determined by the RTP. The encoding provided in the example above is for illustrative purposes, as other methods and techniques can be used to encode the target domain into the subdomain of the RTP.

Figure 5:
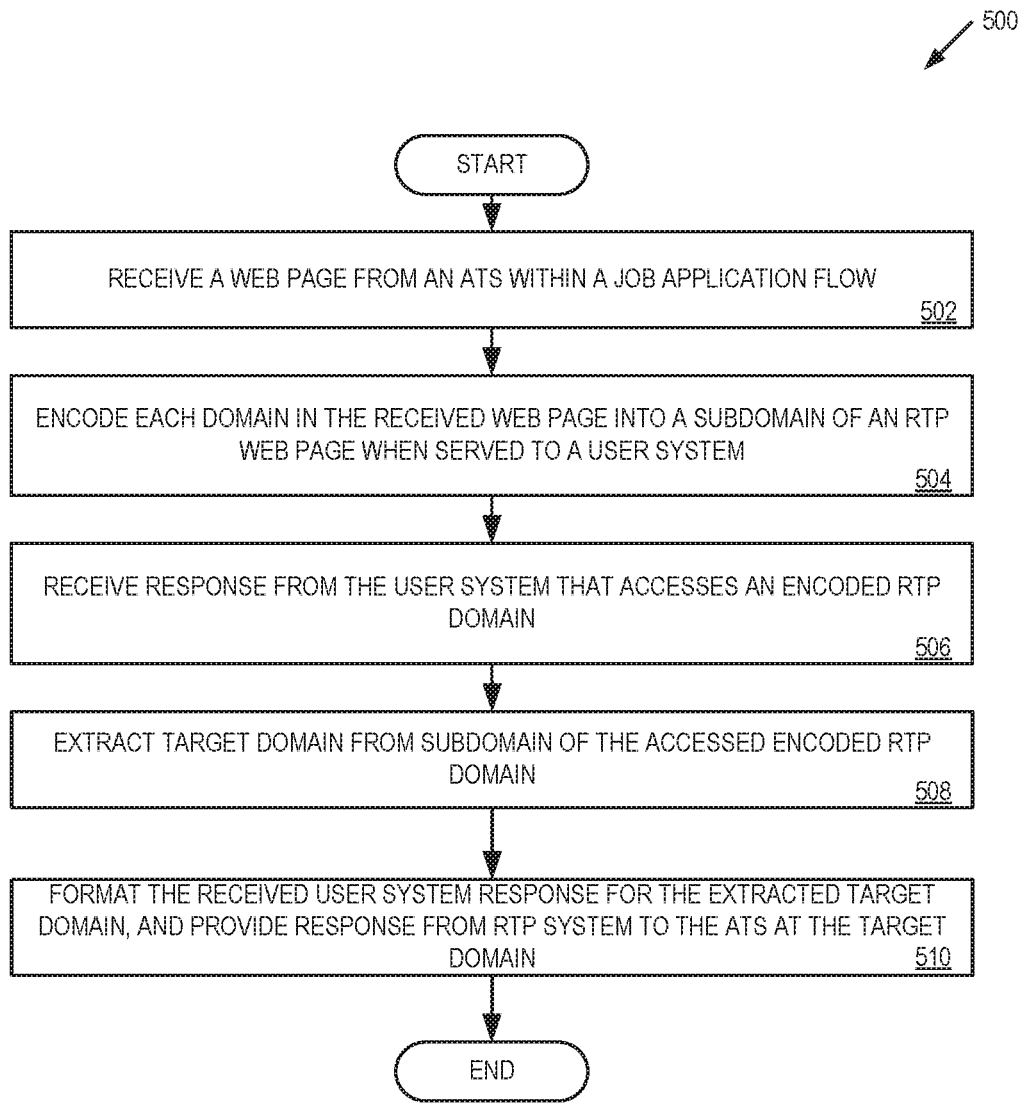
FIG. 5 is a flow diagram of one embodiment of a method for a domain management by a real time proxy system during a job application process between a user system and an ATS.

FIG. 5 is a flow diagram of one embodiment of a method 500 for a domain management by a real time proxy system during a job application process between a user system and an ATS. The method 500 is performed by processing logic that may comprise hardware (circuitry, dedicated logic, etc.), software (such as is run on a general purpose computer system or a dedicated machine), firmware, or a combination. In one embodiment, the method 500 is performed by RTP 120 or 260.

Referring to FIG. 5, processing logic begins by receiving a web page from an ATS within a job application flow (processing block 502). The received web page includes links to target domains (e.g., ATS domains as well as other domains). Processing logic encodes each domain in the received web page into a subdomain of an RTP web page when served to a user system (processing block 504). Processing logic then receives a response from the user system that accesses an encoded RTP domain (processing block 506). Since the original target domain is encoded in the subdomain, processing logic extracts the target domain accordingly (processing block 508), and formats the received user system response and provide the response to the ATS using the target domain (processing block 510).

To further facilitate the RTP's role as intermediary, in one embodiment, the RTP generates a unique email for a user with each job application for each ATS. In one embodiment, as discussed below, the email can be used as a one-way relay between the ATS and the user system. However, a two-way relay can be used consistent with the discussion herein.

Figure 6:
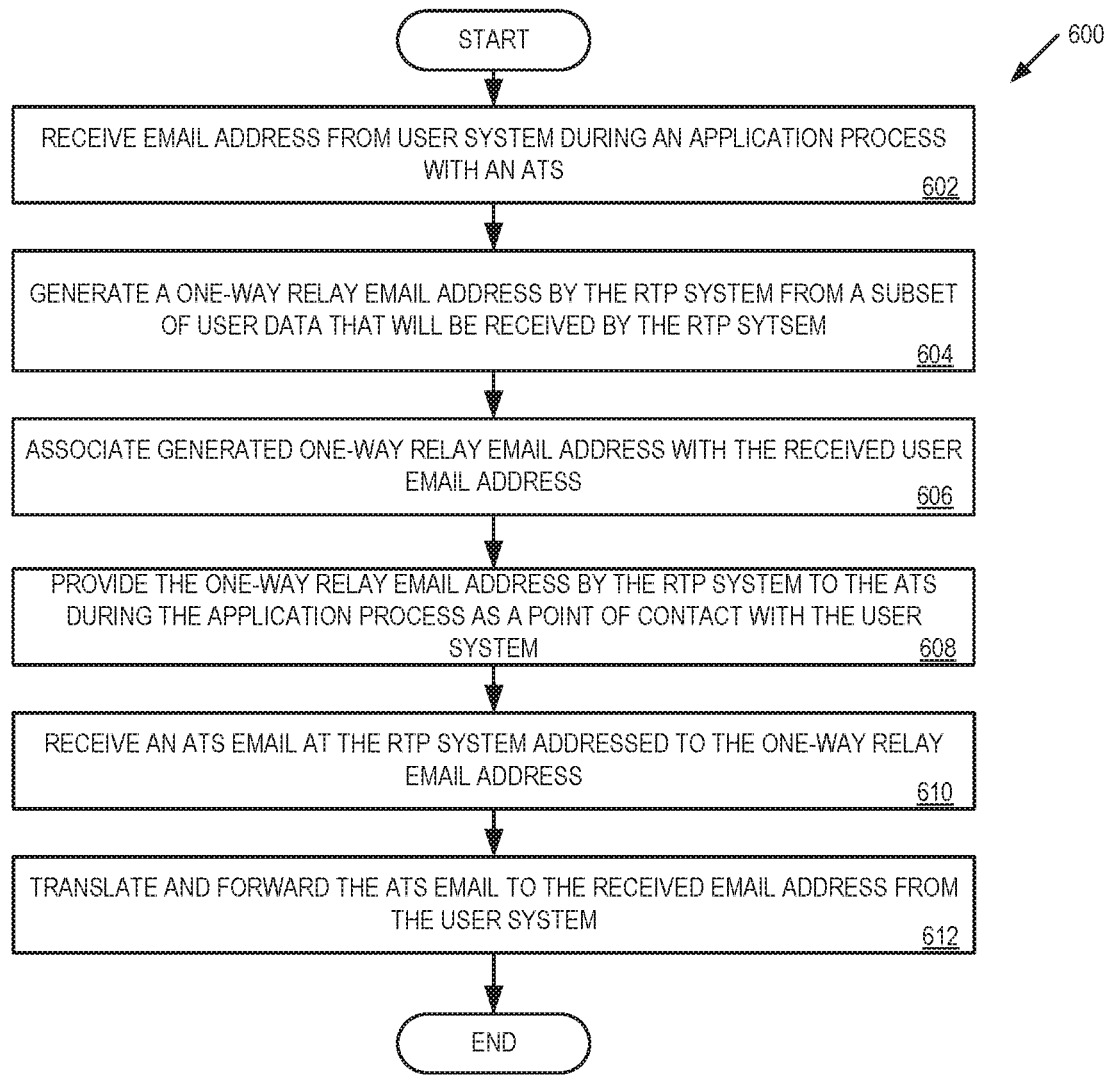
FIG. 6 is a flow diagram of one embodiment of a method for a real time proxy system creating a one-way relay for communication between a user system and an ATS during a job application process.

FIG. 6 is a flow diagram of one embodiment of a method 600 for a real time proxy system creating a one-way relay for communication between a user system and an ATS during a job application process. The method 600 is performed by processing logic that may comprise hardware (circuitry, dedicated logic, etc.), software (such as is run on a general purpose computer system or a dedicated machine), firmware, or a combination. In one embodiment, the method 600 is performed by RTP 120 or 260.

Referring to FIG. 6, processing logic begins by receiving an email address from a user system during an application process with an ATS (processing block 602). As discussed above, an RTP may request a user's email address at the beginning of an application process (e.g., "john@doe.com"). Processing logic then generates a one-way relay email address by the RTP from a subset of user data, where email messages sent to the one-way relay email address will be received by the RTP system (processing block 604). In one embodiment, the one-way relay email address is an email address that is unique to the user and application at the ATS (e.g., "123john.abcATS@reply.RTP.com"). Processing logic then associates the one-way relay email address with the received user email address (processing block 606). In other words, processing logic enables the users email address to be identified from the one-way relay email address, and vice versa.

Then, during the application process with an ATS, processing logic of the RTP system provides the one-way relay email address to the ATS as a point of contact with the user system (processing block 608). It should be noted that the one-way relay email address will not result in a communication sent to this address to be received directly from the user. Instead, the RTP receives an email addressed to the one-way relay email address (processing block 610). However, from the stored association between the one-way relay email address and the received user email address, processing logic of the RTP can reformat and forward the email message received from the ATS to the user system (processing block 612). In one embodiment, the user system is then free to respond directly to the ATS point of contact, outside of the RTP system. This is what makes the generated email address a one-way relay email address—the RTP is able to use the address to track and forward ATS emails to the user system, but the user system is able to respond to the ATS email directly without RTP intervention. For example, an ATS representative may email a user to set up an interview, have a telephone conversation, etc. for which the RTP system need not be involved. The RTP would still receive the email from the ATS. However, once reformatted and forward to the user system, the user system and ATS representative communicate directly outside of the RTP.

Similar to generation of the one-way relay email address, in one embodiment, the RTP system may also perform log-in reuse by generating ATS login credentials. Beneficially to a user of the RTP, credentials for a plurality of ATSs and/or individual applications needn't be managed by the user/user system, as they can be managed by the RTP. Thus, the user/user system need only remember one username and password to the RTP system, which manages login credentials to each individual ATS and application.

Figure 7:
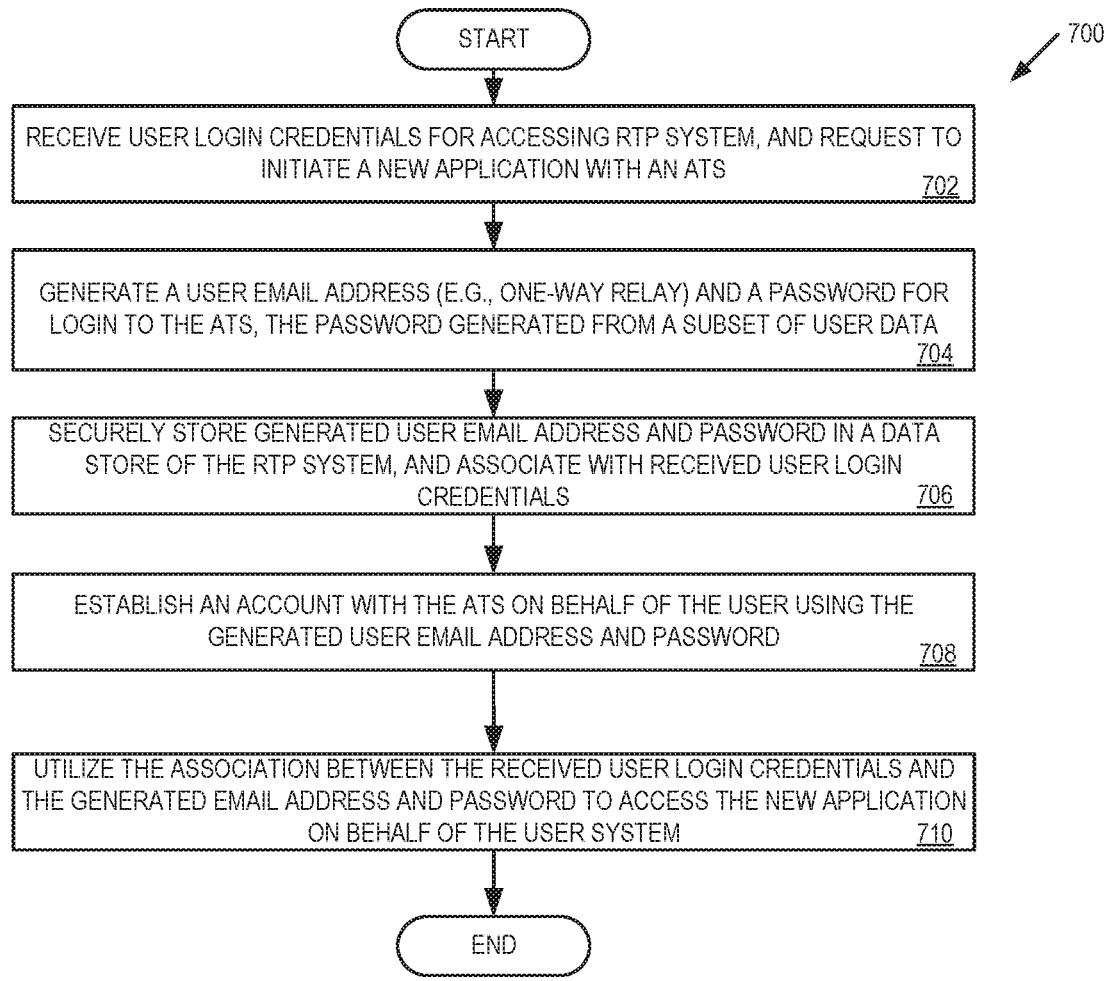
FIG. 7 is a flow diagram of one embodiment of a method for log-in reuse management by a real time proxy system during a job application process.

FIG. 7 is a flow diagram of one embodiment of a method 700 for log-in reuse management by a real time proxy system during a job application process. The method 700 is performed by processing logic that may comprise hardware (circuitry, dedicated logic, etc.), software (such as is run on a general purpose computer system or a dedicated machine), firmware, or a combination. In one embodiment, the method 700 is performed by RTP engine 120 or 260.

Referring to FIG. 7, processing logic begins by receiving user login credentials for accessing an RTP system, and a request to initiate a new application with an ATS (processing block 702). These need not be received at the same time, as a user with an RTP account may log into the RTP, browse job listings, and then select to apply for a listed job.

Processing logic generates a user email address as discussed above in FIG. 6) and further generates a password for login to the ATS, the password generated from a subset of user data (processing block 704). In one embodiment the password may be generated from a portion of user data, and a function applied to that user data, so that a unique and safe password is generated. The generated email address and password are securely stored in a data store (e.g., encrypted) and associated with the received user login credentials (processing block 706).

Processing logic is then able to establish an account at the ATS on behalf of the user using the generated user email address and password (processing block 708). Then, at a later time, processing logic can use the association between a user's RTP login credentials and ATS login credentials to access an application at an ATS on behalf of a user system (processing block 710).

Figure 8:
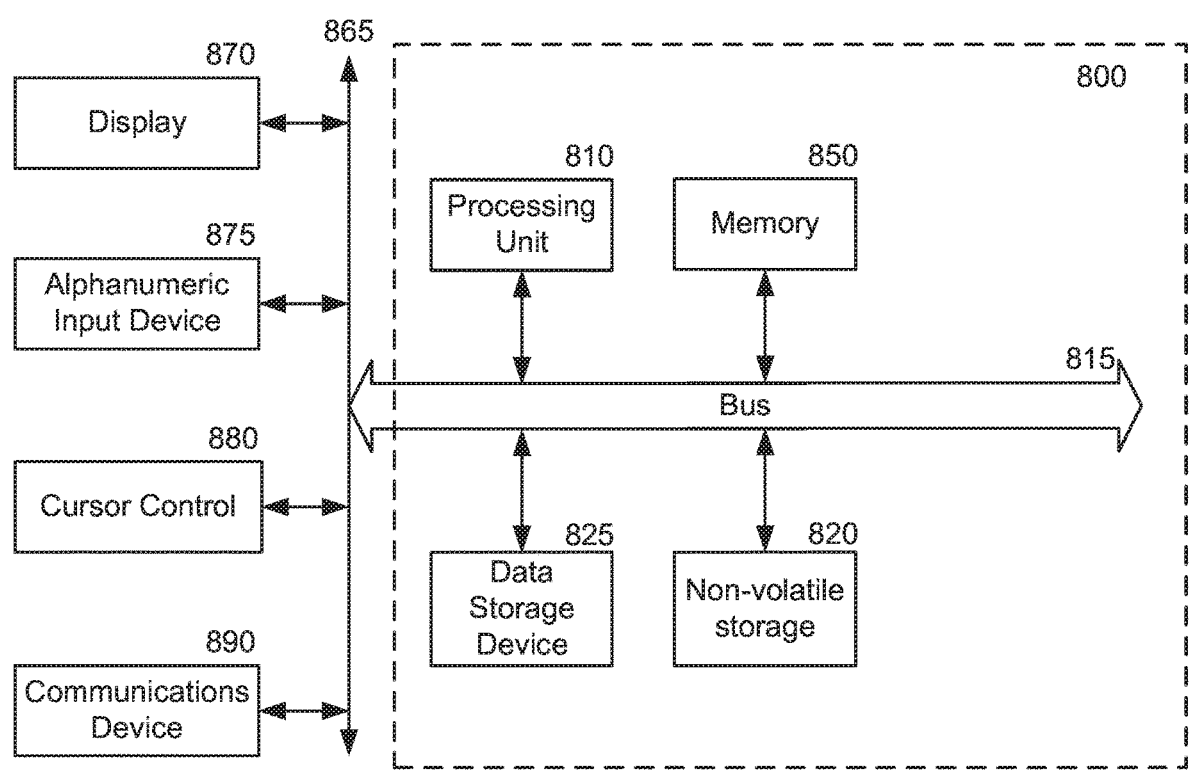
FIG. 8 is one embodiment of a computer system that may be used in accordance with an embodiment of the invention.

FIG. 8 is one embodiment of a computer system that may be used with the present invention. It will be apparent to those of ordinary skill in the art, however that other alternative systems of various system architectures may also be used.

The data processing system illustrated in FIG. 8 includes a bus or other internal communication means 815 for communicating information, and a processor 810 coupled to the bus 815 for processing information. The system further comprises a random access memory (RAM) or other volatile storage device 850 (referred to as memory), coupled to bus 815 for storing information and instructions to be executed by processor 810. Main memory 850 also may be used for storing temporary variables or other intermediate information during execution of instructions by processor 810. The system also comprises a read only memory (ROM) and/or static storage device 820 coupled to bus 815 for storing static information and instructions for processor 810, and a data storage device 825 such as a magnetic disk or optical disk and its corresponding disk drive. Data storage device 825 is coupled to bus 815 for storing information and instructions.

The system may further be coupled to a display device 870, such as a liquid crystal display (LCD), coupled to bus 815 through bus 865 for displaying information to a computer user. An alphanumeric input device 875, including alphanumeric and other keys, may also be coupled to bus 815 through bus 865 for communicating information and command selections to processor 810. An additional user input device is cursor control device 880, such as a touchpad, mouse, a trackball, stylus, or cursor direction keys coupled to bus 815 through bus 865 for communicating direction information and command selections to processor 810, and for controlling cursor movement on display device 870.

Another device, which may optionally be coupled to computer system 800, is a communication device 890 for accessing other nodes of a distributed system via a network. The communication device 890 may include any of a number of commercially available networking peripheral devices such as those used for coupling to an Ethernet, token ring, Internet, or wide area network. The communication device 890 may further be a null-modem connection, or any other mechanism that provides connectivity between the computer system 800 and the outside world. Note that any or all of the components of this system illustrated in FIG. 8 and associated hardware may be used in various embodiments of the present invention.

It will be appreciated by those of ordinary skill in the art that any configuration of the system may be used for various purposes according to the particular implementation. The control logic or software implementing the present invention can be stored in main memory 850, mass storage device 825, or other storage medium locally or remotely accessible to processor 810.

It will be apparent to those of ordinary skill in the art that the system, method, and process described herein can be implemented as software stored in main memory 850 or read only memory 820 and executed by processor 810. This control logic or software may also be resident on an article of manufacture comprising a computer readable medium having computer readable program code embodied therein and being readable by the mass storage device 825 and for causing the processor 810 to operate in accordance with the methods and teachings herein.

The present invention may also be embodied in a handheld or portable device containing a subset of the computer hardware components described above. For example, the handheld device may be configured to contain only the bus 815, the processor 810, and memory 850 and/or 825. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 810, a data storage device 825, a bus 815, and memory 850, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:

1. A computer-implemented method, comprising:
   intercepting a user request with a real-time proxy system, wherein the user request is directed to a job listing server sent by a mobile device user system and the user request is a request to apply for a job from a mobile device user system;
   generating a generated email address at the real-time proxy system for a user of the mobile device user system;
   associating the generated email address for the user with an actual email address of the user;
   initiating with the real-time proxy system a job application process on behalf of the user with an application tracking system and utilizing the generated email address as at least part of a set of credentials for the user that enable the real-time proxy system to access the application tracking system on behalf of the mobile device user system;
   accessing, by the real-time proxy system in response to the user request to apply for the job, a job application web page served from the application tracking system, wherein (i) the user request is generated by the mobile device user system, (ii) the real-time proxy system is included in a job aggregator server, (ii) the real-time proxy system is an intermediary between the application tracking system and the mobile device user system, and (iii) the job application web page is one of a series of job application web pages for the job served by the application tracking system and a display of the job application web page displays at least a partially complete job application to apply for the job;
   rewriting at least a portion of the job application web page and one or more links within the job application web page, wherein the portion of the job application web page is reformatted based on capabilities of the mobile device user system, and wherein the one or more links are rewritten to resolve at the real-time proxy system and not at the application tracking system and the one or more links encode application tracking system sub-domain information to track the job application web page to the application tracking system;
   substituting application tracking system cookies with real-time proxy system cookies, wherein the real-time proxy system cookies are simplified relative to the application tracking system cookies for compatibility with the mobile device user system;
   serving a rewritten version of the job application web page from the real-time proxy system to the user system;
   converting a response received from the mobile device user system to the rewritten version of the job application web page to a form expected by the application tracking system;
   extracting a domain of the application tracking system from the response;
   submitting the converted response to the application tracking system; and
   receiving an email at the real-time proxy system directed to the generated email address;
   reformatting the email for the mobile device user system; and
   forwarding the email from the real-time proxy system to the actual email address of the user associated with the generated email address.

2. The method of claim 1, further comprises:
   receiving an error from the application tracking system with respect to the submission of the converted response to the application tracking system; and
   serving a rewritten version of the job application web page that indicates the error to the mobile device user system from the real-time proxy system.

3. The method of claim 1, wherein rewriting the one or more links within the job application web page further comprises:
   determining an original target domain of a link within the job application web page;
   encoding the original target domain into a subdomain associated with the real-time proxy system to create a virtual domain link that resolves at the real-time proxy system; and
   replacing the link within the job application web page with the virtual domain link.

4. The method of claim 3, further comprising:
   receiving a response from the mobile device user system including a selection of the virtual domain link;
   decoding the original target domain from the subdomain of the selected virtual domain link; and
   converting the response to the form expected by the application tracking system based on the decoding of the original target domain from the selected link.

5. The method of claim 1, wherein rewriting at least a portion of the job application web page comprises hiding a portion of the job application web page when rewritten.

6. The method of claim 1, wherein rewriting at least a portion of the job application web page further comprises:
   determining that user data requested in the job application web page is available to the real-time proxy system;
   automatically supplying relevant user data in a response to the application tracking system without notification to the mobile device user system;
   receiving a next job application web page from the series of job application web pages as a result of automatically supplying the relevant user data to the application tracking system; and serving a rewritten version of the next job application web page from the real-time proxy system to the mobile device user system.

7. The method of claim 6, wherein the user data comprises a user resume.

8. The method of claim 1, further comprising:
supplying the generated email address to the application tracking system as a point of contact for the mobile device user system.

9. The method of claim 8, further comprising:
receiving, at the real-time proxy system from the application tracking system, an email message addressed to the generated email address;
determining the association between the generated unique email address and the actual email address of the user; and
forwarding the received email message from the real-time proxy system to the mobile device user system at the actual email address of the user, wherein a reply to the email message by the mobile device user system will be addressed to the application tracking system.

10. The method of claim 8, further comprising:
establishing an account at the application tracking system, by the real-time proxy system on behalf of the mobile device user system, using the generated email address and a generated password.

11. The method of claim 1, further comprises:
providing the mobile device user system with a collection of jobs associated with a plurality of different application tracking systems; and
receiving user selection at the real-time proxy system to apply for the job with the application tracking system.

12. The method of claim 1, wherein rewriting at least a portion of the job application web page comprises converting an original version of the portion of the job application web page to a mobile friendly version of the portion of the job application web page.

13. The method of claim 1, further comprising:
rewriting at least a second portion of the job application web page by replacing one or more web page elements from the job application web page associated with user-initiated actions for interacting directly with the application tracking system, with one or more replacement web page elements for interacting with the application tracking system through the real-time proxy system.

14. The method of claim 1, further comprising:
intercepting at least one additional web page related to the series of job application web pages, wherein the at least one additional web page is not part of an application for the job; and
serving a rewritten version of the at least one additional job application web page to manage interactions between the user and the application tracking system resulting from the at least one additional web page.

15. A non-transitory computer readable storage medium including instructions that, when executed by a processor, cause the processor to perform a method comprising:
intercepting a user request with a real-time proxy system, wherein the user request is directed to a job listing server sent by a mobile device user system and the user request is a request to apply for a job from the mobile device user system;
generating a generated email address for a user of the mobile device user system;
associating the generated email address at the real-time proxy system for the user with an actual email address of the user;
initiating with the proxy system a job application process on behalf of the user with an application tracking system and utilizing the generated email address as at least part of a set of credentials for the user that enable the proxy system to access the application tracking system on behalf of the mobile device user system;
accessing, by the real-time proxy system in response to the user request to apply for the job, a job application web page served from the application tracking system, wherein (i) the user request is generated by the mobile device user system, (ii) the real-time proxy system is included in a job aggregator server, (ii) the real-time proxy system is an intermediary between the application tracking system and the mobile device user system, and (iii) the job application web page is one of a series of job application web pages for the job served by the application tracking system and a display of the job application web page displays at least a partially complete job application to apply for the job;
rewriting at least a portion of the job application web page and one or more links within the job application web page, wherein the portion of the job application web page is reformatted based on capabilities of the mobile device user system, and wherein the one or more links are rewritten to resolve at the real-time proxy system and not at the application tracking system and the one or more links encode application tracking system sub-domain information to track the job application web page to the application tracking system;
substituting application tracking system cookies with real-time proxy system cookies, wherein the real-time proxy system cookies are simplified relative to the application tracking system cookies for compatibility with the mobile device user system;
serving a rewritten version of the job application web page from the real-time proxy system to the mobile device user system;
converting a response received from the mobile device user system to the rewritten version of the job application web page to a form expected by the application tracking system; and
extracting a domain of the application tracking system from the response;
submitting the converted response to the application tracking system; and
receiving an email at the real-time proxy system directed to the generated email address;
reformatting the email for the mobile device user system; and
forwarding the email from the real-time proxy system to the actual email address of the user associated with the generated email address.

16. The non-transitory computer readable storage medium of claim 15, further comprises:
receiving an error from the application tracking system with respect to the submission of the converted response to the application tracking system; and
serving a rewritten version of the job application web page that indicates the error to the mobile device user system from the real-time proxy system.

17. The non-transitory computer readable storage medium of claim 15, wherein rewriting the one or more links within the job application web page further comprises:

determining an original target domain of a link within the job application web page;
encoding the original target domain into a subdomain associated with the real-time proxy system to create a virtual domain link that resolves at the real-time proxy system; and
replacing the link within the job application web page with the virtual domain link.

18. The non-transitory computer readable storage medium of claim 17, further comprising:
receiving a response from the mobile device user system including a selection of the virtual domain link;
decoding the original target domain from the subdomain of the selected virtual domain link; and
converting the response to the form expected by the application tracking system based on the decoding of the original target domain from the selected link.

19. The non-transitory computer readable storage medium of claim 15, wherein rewriting at least a portion of the job application web page comprises hiding a portion of the job application web page when rewritten.

20. The non-transitory computer readable storage medium of claim 15, wherein rewriting at least a portion of the job application web page further comprises:
determining that user data requested in the job application web page is available to the real-time proxy system;
automatically supplying relevant user data in a response to the application tracking system without notification to the mobile device user system;
receiving a next job application web page from the series of job application web pages as a result of automatically supplying the relevant user data to the application tracking system; and
serving a rewritten version of the next job application web page from the real-time proxy system to the mobile device user system.

21. The non-transitory computer readable storage medium of claim 20, wherein the user data comprises a user resume.

22. The non-transitory computer readable storage medium of claim 15, the method further comprises:
supplying the generated email address to the application tracking system as a point of contact for the mobile device user system.

23. The non-transitory computer readable storage medium of claim 22, further comprising:
receiving, at the real-time proxy system from the application tracking system, an email message addressed to the generated email address;
determining the association between the generated email address and the actual email address of the user; and
forwarding the received email message from the real-time proxy system to the mobile device user system at the actual email address of the user, wherein a reply to the email message by the mobile device user system will be addressed to the application tracking system.

24. The non-transitory computer readable storage medium of claim 22, further comprising:
establishing an account at the application tracking system, by the real-time proxy system on behalf of the mobile device user system, using the generated email address and a generated password.

25. The non-transitory computer readable storage medium of claim 15, further comprising:
providing the mobile device user system with a collection of jobs associated with a plurality of different application tracking systems; and
receiving user selection at the real-time proxy system to apply for the job with the application tracking system.

26. The non-transitory computer readable storage medium of claim 15, wherein rewriting at least a portion of the job application web page comprises converting an original version of the portion of the job application web page to a mobile friendly version of the portion of the job application web page.

27. A server computer system comprising:
a memory; and
a processor coupled with the memory, the processor configured to:
intercept a user request with a real-time proxy system, wherein the user request is directed to a job listing server sent by a mobile device user system and the user request is a request to apply for a job from the mobile device user system;
generate a generated email address at the real-time proxy system for a user of the mobile device user system;
associate the generated email address for the user with an actual email address of the user;
initiate with the real-time proxy system a job application process on behalf of the user with an application tracking system and utilizing the generated email address as at least part of a set of credentials for the user that enable the real-time proxy system to access the application tracking system on behalf of the mobile device user system;
in response to the user request to apply for a job, access, by the real-time proxy system in response to the user request to apply for the job, a job application web page served from the application tracking system, wherein (i) the user request is generated by the mobile device user system, (ii) the real-time proxy system is included in a job aggregator server, (ii) the real-time proxy system is an intermediary between the application tracking system and the mobile device user system, and (iii) the job application web page is one of a series of job application web pages for the job served by the application tracking system and a display of the job application web page displays at least a partially complete job application to apply for the job;
rewrite at least a portion of the job application web page and one or more links within the job application web page, wherein the portion of the job application web page is reformatted based on capabilities of the mobile device user system, and wherein the one or more links are rewritten to resolve at the real-time proxy system and not at the application tracking system and the one or more links encode application tracking system subdomain information to track the job application web page to the application tracking system;
substitute application tracking system cookies with real-time proxy system cookies, wherein the real-time proxy system cookies are simplified relative to the application tracking system cookies for compatibility with the mobile device user system;
serve a rewritten version of the job application web page from the server computer system to the mobile device user system;
convert a response received from the mobile device user system to the rewritten version of the job application web page to a form expected by the application tracking system; and
extracting a domain of the application tracking system from the response;

submit the converted response to the application tracking system; and receiving an email at the real-time proxy system directed to the generated email address;

reformatting the email for the mobile device user system; and forwarding the email from the real-time proxy system to the actual email address of the user associated with the generated email address.

28. The server computer system of claim 27, wherein the processor is further configured to:

receive an error from the application tracking system with respect to the submission of the converted response to the application tracking system; and serve a rewritten version of the job application web page that indicates the error to the mobile device user system from the real-time proxy system.

29. The server computer system of claim 27, wherein the processor configured to rewrite the one or more links within the job application web page further comprises the processor configured to:

determine an original target domain of a link within the job application web page;

encoding the original target domain into a subdomain associated with the server computer system to create a virtual domain link that resolves at the server computer system; and replace the link within the job application web page with the virtual domain link.

\* \* \* \* \*